(12) United States Patent
Long et al.

(10) Patent No.: US 6,471,041 B1
(45) Date of Patent: Oct. 29, 2002

(54) ROLLER CHAIN ATTACHMENT MEMBER

(75) Inventors: Leslie T. Long, Appleton; Ryan P. Rosenow, Greenville, both of WI (US)

(73) Assignee: Kimberly-Clark Worldwide, Inc., Neenah, WI (US)

( * ) Notice: Subject to any disclaimer, the term of this patent is extended or adjusted under 35 U.S.C. 154(b) by 0 days.

(21) Appl. No.: 09/541,475

(22) Filed: Mar. 31, 2000

(51) Int. Cl.[7] .............................................. B65G 13/02
(52) U.S. Cl. .............................. 198/699.1; 198/867.14; 474/230
(58) Field of Search ................................. 474/155, 156, 474/218, 226, 230; 198/867.14, 699.1

(56) References Cited

U.S. PATENT DOCUMENTS

| | | | |
|---|---|---|---|
| 2,358,292 A | * | 9/1944 | Malhiot ................. 198/803.11 |
| 3,643,792 A | | 2/1972 | Resener |
| 3,675,759 A | | 7/1972 | Koppe |
| 3,724,644 A | * | 4/1973 | Reimers ..................... 198/131 |
| 3,779,364 A | * | 12/1973 | Kammann ................... 198/131 |
| 4,096,943 A | | 6/1978 | Gentsch |
| 4,159,056 A | | 6/1979 | Pirman et al. |
| 4,518,077 A | | 5/1985 | Ronco et al. |
| 4,582,193 A | | 4/1986 | Larsson |
| 4,611,710 A | | 9/1986 | Mitsufuji |
| 5,042,244 A | | 8/1991 | Worsley |
| 5,337,887 A | * | 8/1994 | Greenwell et al. .......... 198/803 |
| 5,546,734 A | * | 8/1996 | Moncrief et al. ............. 53/534 |
| 5,746,302 A | | 5/1998 | Bowman |
| 5,857,558 A | | 1/1999 | Irvine |
| 5,911,303 A | * | 6/1999 | Malanowski ................ 198/731 |
| 6,176,370 B1 | * | 1/2001 | Davies ................... 198/867.15 |

FOREIGN PATENT DOCUMENTS

| | | | | |
|---|---|---|---|---|
| JP | 62185619 | * | 8/1987 | .............. 104/172.1 |

OTHER PUBLICATIONS

Lambda Λ Chain Lube–Free Roller Chain Brochure, U.S. Tsubaki, Inc. 1995.

* cited by examiner

Primary Examiner—David A. Bucci
Assistant Examiner—Vicky A. Johnson
(74) Attorney, Agent, or Firm—Dority & Manning

(57) ABSTRACT

An attachment member for attaching to a roller chain tab includes a body member with a cavity defined in a bottom end thereof. This cavity has dimensions corresponding essentially to a tab provided on a roller chain link plate. The cavity is defined by a back wall, sides, and a front wall, and further includes a protuberance that extends from the back wall into the cavity towards the front wall. This protuberance has a shape so as to fit into a hole defined in the tabs provided on the roller chain link plates upon the body member being slid onto the tab.

17 Claims, 3 Drawing Sheets

ROLLER CHAIN ATTACHMENT MEMBER

BACKGROUND OF THE INVENTION

The present invention relates generally to roller chains used in packaging and conveying machinery, and more particularly to an improved device for mounting attachment members or parts to lugs or tabs provided on the roller chain. The invention has particular application in endless chain conveying or packaging machines, but is not limited to such machines.

The use of endless roller chains in machines for packaging or conveying articles is well known. The roller chain links may serve various functions, including separating conveyed items into groups, moving conveyed items, loading or pushing grouped items into cartons, etc. To carry out these various functions, the roller chains frequently require mounting of working "attachment" members, such as flight bars, directly onto the roller chain links. With a certain type of commercially available roller chain, metal mounting tabs or "lugs" are provided on the roller link plates or pin link plates. An attachment member is mounted directly onto the metal tabs.

With conventional systems, the attachment member is connected with a threaded fastener to the metal tab or to a metal backing plate. This is particularly the case if a plastic attachment member is to be attached to the roller chain. However, when chains are to be replaced, the removal of threaded mounting parts is time consuming. Also, the attachment member is occasionally exposed to relatively great stress, particularly if a jam occurs in the machine. If the attachment member is bolted or welded to the link tab, substantial damage may occur to the link or the roller chain. If this happens, the chain must be taken apart and the damaged links removed, thereby requiring a substantial amount of time and labor.

The present invention relates to an improved device for mounting any manner of attachment member to conventional roller chains that overcomes many of the disadvantages of conventional devices.

SUMMARY OF THE INVENTION

Objects and advantages of the invention will be set forth in part in the following description, or may be apparent from the description, or may be learned through practice of the invention.

The present invention relates to an improved attachment member for attaching in a snap-fit manner to a tab or lug of a roller chain link plate. The attachment member may be any type of conventional flight bar, lug, etc. The roller chains are conventional devices having alternating roller links and pin links. The roller links include opposite roller link plates and the pin links include opposite link plates. The metal tabs are formed integral with either or both of the roller link plates or pin link plates. The tabs may extend generally perpendicular from their respective link plates, or may lie in the same vertical plane as the link plates. With conventional roller chains, these metal tabs are typically provided with at least one hole defined therethrough. Wider tabs may include two holes. These holes have conventionally served for mounting attachment members with threaded fasteners or with a fastener extending therethrough into a metal backing plate.

The attachment member according to the invention includes a body member having a configuration for carrying out a desired roller chain operation upon attachment of the body member to the roller chain. It should thus be appreciated that the body member is not limited to any particular type of shape or configuration. The body member includes a bottom end having a cavity defined therein. This cavity has dimensions corresponding essentially to those of a tab carried by a roller chain link plate (roller link plate or pin link plate). In this manner, the body member is slidable with a relatively tight or snug fit onto the tab.

The body member cavity is defined by a back wall, sides, and a front wall, and further includes a protuberance that extends from either of the back wall or front wall into the cavity towards the opposite wall. This protuberance has a shape so as to fit into a hole defined in the tab upon the body member being slid onto the tab. In this manner, the body member "snap-fits" onto the tab to securely attach the attachment member to the roller chain.

The body member may be formed of a plastic material so as to minimize inertia forces which tend to limit machine speeds and increase wear of components.

The back wall of the cavity may also include a resilient tab defined between two longitudinal slits. The protuberance may be provided on this resilient tab. In this manner, the resilient tab adds to the snap-fit action of the attaching device upon the body member being slid onto the tab of the roller chain link plate.

It should be appreciated that the longitudinal slits are not necessary for operation of the device. The body member may be formed of a material having enough inherent resiliency to allow the body member to be easily slid onto the roller chain tab member without the aid of a slit.

The front wall may further comprise an opening defined therethrough into the cavity. This opening is aligned opposite from the protuberance so that a visual verification may be made that the attachment member has been properly secured to the roller chain. The opening may also provide access for a tool to aid in disengaging the attachment member from the roller chain.

The invention also relates to a roller chain assembly that includes a conventional roller chain and the attachment member as described herein.

The invention will be described in greater detail below through use of the appended figures.

DETAILED DESCRIPTION

Figure 1:
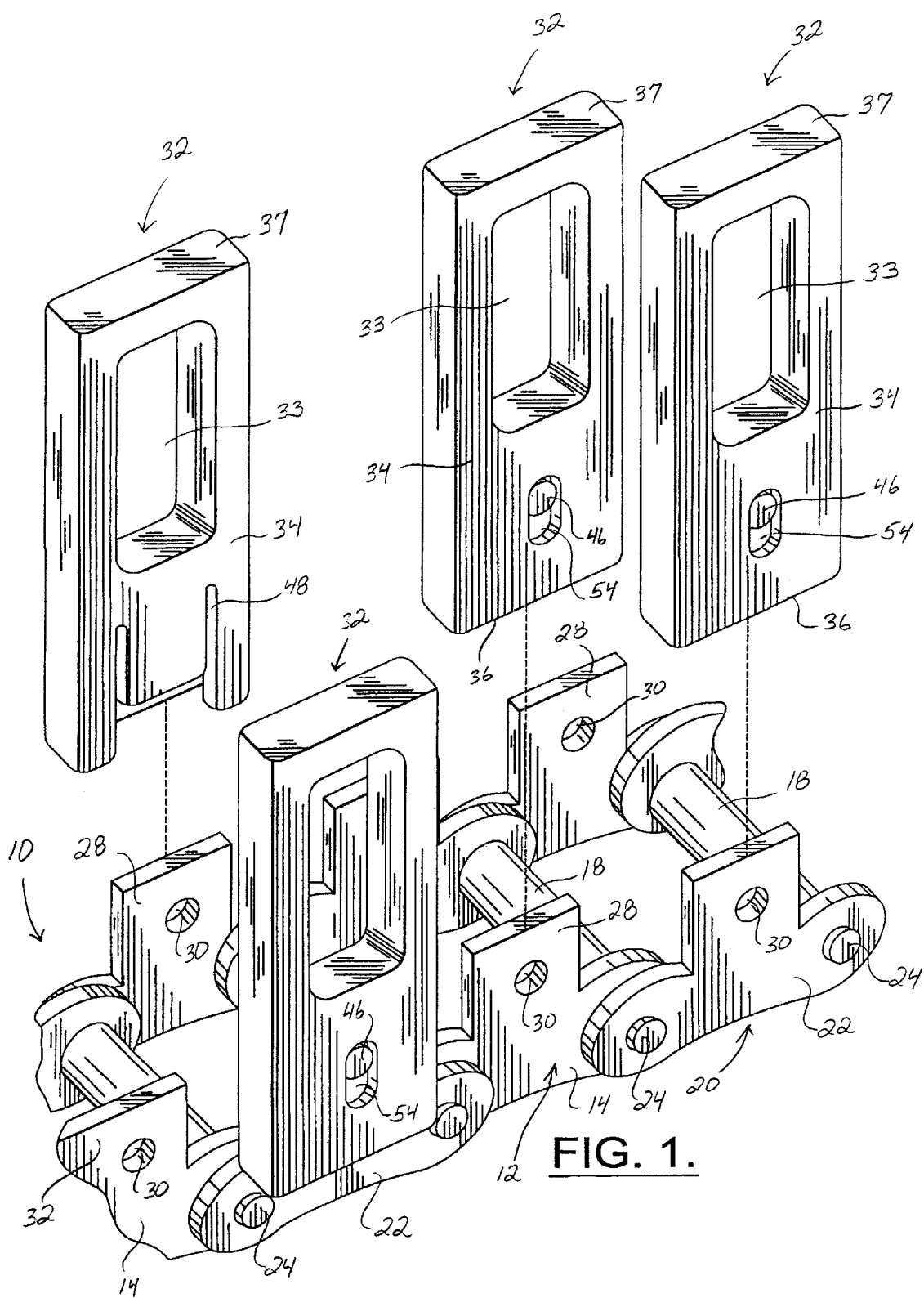
FIG. 1 is a perspective view of a roller chain assembly incorporating attachment members according to the invention.
Figure 2:
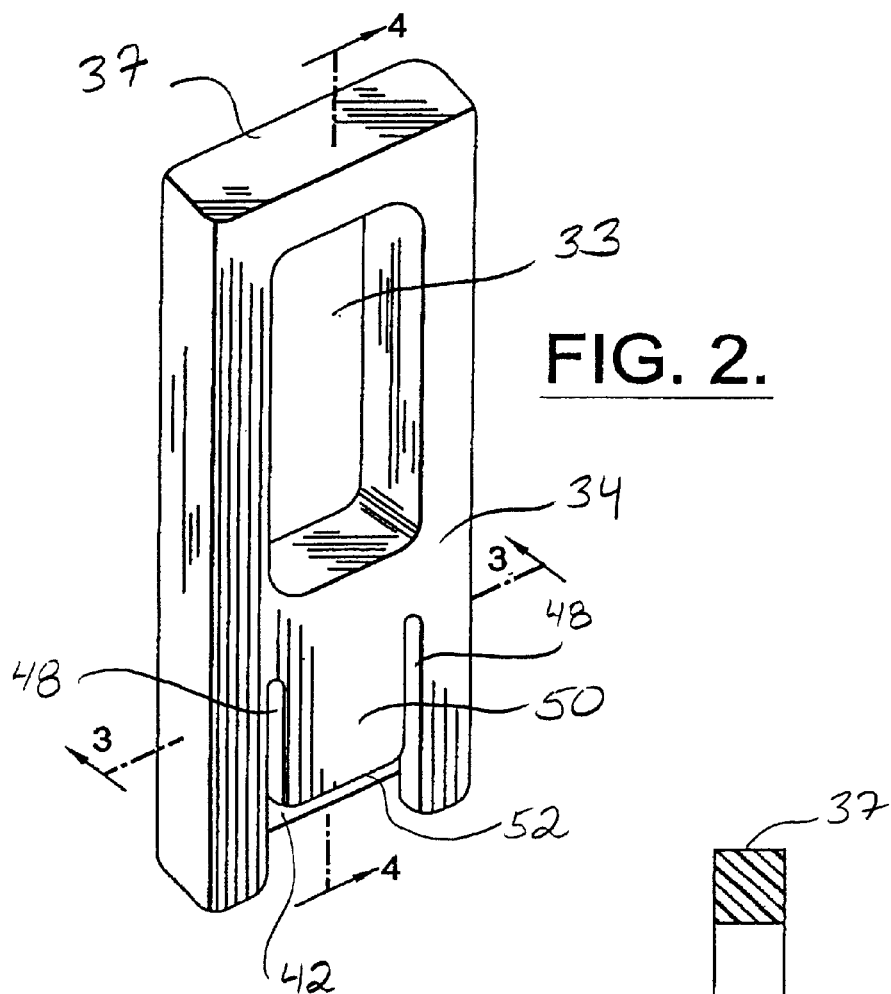
FIG. 2 is a perspective view of an attachment member according to the invention.
Figure 3:
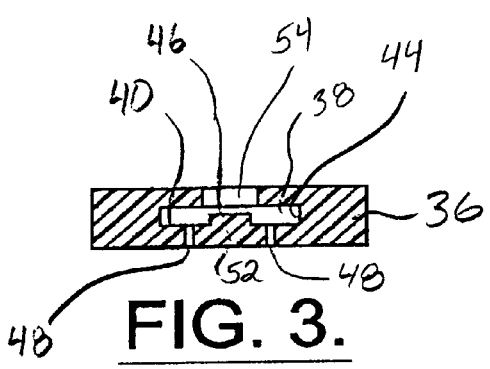
FIG. 3 is an end view of the attachment member taken along the lines indicated in FIG. 2.
Figure 4:
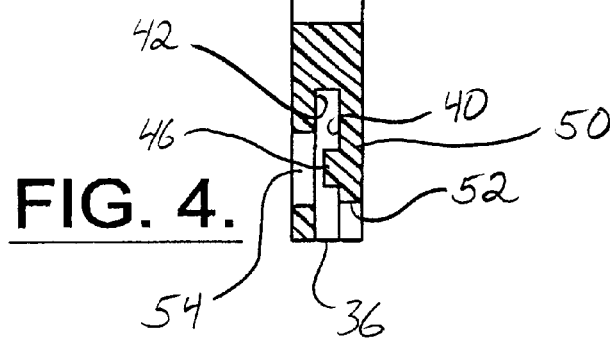
FIG. 4 is a side view of the attachment member taken along the lines indicated in FIG. 2.

Reference will now be made in detail to exemplary embodiments of the invention, one or more examples of which are illustrated in the drawings. Each example is provided by way of explanation of the invention, and not meant as a limitation of the invention. For example, features illustrated or described as part of one embodiment can be used on another embodiment to yield a still further embodiment. It is intended that the present application include such modifications and variations.

FIG. 1 illustrates a conventional roller chain 10 incorporating attachment members 32 according to the invention. Roller chains 10 are well known by those skilled in the art and need not be described in detail herein. Briefly, a typical roller chain used on packaging and conveying machinery comprises roller links 12 and pin links 20. Roller links 12 include spaced apart roller link plates 14. Likewise, pin links 20 include spaced apart pin link plates 22. Bushings 18 are provided between the roller link plates 14. Pins 24 extend through the pin link plates 22, the roller link plates 14, bushings 18, and then through the opposite side roller link plates and into the opposite pin link plates. Pins 24 are typically press-fitted into holes in the pin link plates 22 to securely assemble the roller chain 10.

Conventional roller chains are commercially available from any number of suppliers, including U.S. Tsubaki, Inc. of Wheeling, Ill.

Conventional roller chains may have attachment tabs or lugs 28 formed integral with roller link plates 14 or pin link plates 22. The attachment tabs 28 may be defined on all of the link plates, as illustrated in FIG. 1. Tabs 28 may have various configurations. For example, in the embodiment illustrated in FIG. 1, tabs 28 extend generally vertically and in the same plane as their respective plates 14, 12. Tabs 28 are typically provided with a hole 30 defined therethrough. This hole 30 is conventionally used to attach various types of working members to the roller chain 10. With typical devices, particularly wherein the attachment members are plastic, threaded fasteners are used to directly secure the attachment members to the tabs 28 by way of the holes 30. These threaded fasteners would either thread directly into the holes 30, or into a metal backing plate.

Figures 5, 6, 7:
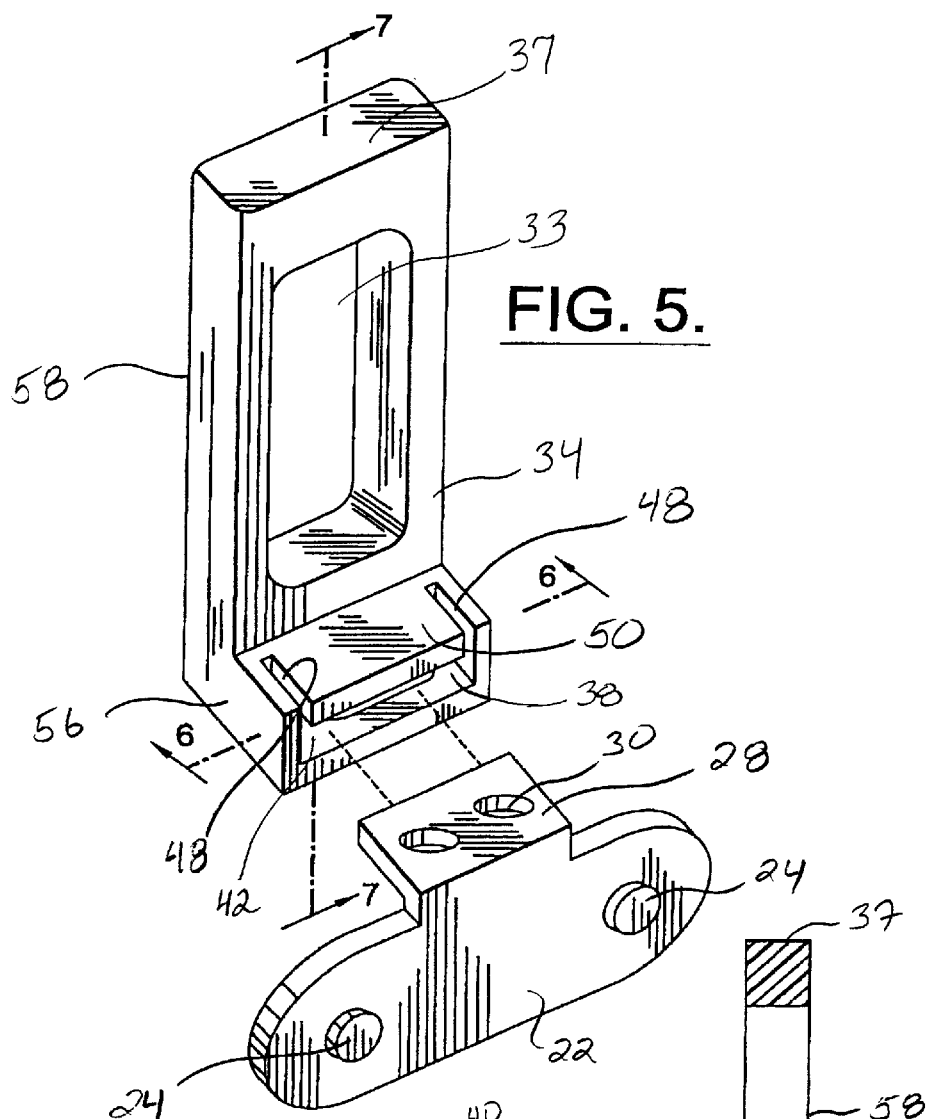
FIG. 5 is a perspective view of an alternate embodiment of an attachment member according to the invention.
FIG. 6 is an end view of the embodiment illustrated in FIG. 5 taken long the lines indicated.
FIG. 7 is a side view of the embodiment illustrated in FIG. 5 taken along the lines indicated.

FIG. 5 shows an alternative embodiment of a pin link plate 22 wherein the attachment tab 28 extends generally perpendicular from the plane of the pin link plate 22. It should be appreciated that these transversely extending tabs 28 could be provided on any pattern of the roller link plates 14 or pin link plates 22. In this embodiment, two holes 30 are defined through tab 28. It should be appreciated that any configuration or number of holes may be utilized in this regard.

Attachment members 32 according to one embodiment of the invention are shown in FIGS. 1 through 4. The attachment members 32 may be formed of any material, including plastic. Plastic may be desired in that it is lightweight and thus would minimize inertia forces which limit machine speeds and increase wear of components. The attachment members 32 are illustrated in the figures as generally straight flight bars. The bars may be "solid" or may have a window 33 defined therethrough to further reduce weight. It should be appreciated that attachment members 32 are not limited in their shape or configuration in any manner. The attachment members 32 are illustrated in the figures as generally straight or vertical flight bars merely for the sake of describing certain aspects of the invention. The attachment members 32 have a body 34 that can take on various configurations or shapes depending upon the particular desired roller chain operation that the attachments are designed to carry out.

Each body member 34 of the attachment members includes a top end 37 and a cavity 38 defined in a bottom end 36 thereof. This cavity 38 has internal dimensions that generally correspond to those of tabs 28 so that the body member is slidable with a snug fit onto the tabs 28.

In the embodiment of FIGS. 1 through 4, body member 34 is essentially a vertically extending member and cavity 38 is defined in the bottom 36 thereof. In the embodiment of FIG. 5, body member 34 includes a top section 58 disposed generally perpendicular to a bottom section 56. As can be seen from FIG. 5, this configuration is particularly suited for attachment to a transversely extending tab 28. In this embodiment, cavity 38 is defined in the generally horizontal bottom section 56.

The cavity 38 is defined by a back wall 40, front wall 42, and side walls 44. In the illustrated embodiment, a protuberance 46 is defined on back wall 40 and extends towards front wall 42. This protuberance could also be defined on front wall 42 and extend towards back wall 40. This protuberance 46 has a size and shape so as to extend at least partially into the holes 30 provided on the link plates 14, 22 when the attachment members are slid onto tabs 28. Referring to the embodiments of FIGS. 1 through 4, a single protuberance 46 is defined on back wall 40. Referring to the embodiment of FIGS. 5 through 7, two such protuberances 46 are defined on back wall 40 to engage with the two holes 30 defined on tab 28.

An opening 54 may also be provided through front wall 42. Opening 54 may have any shape or configuration. For example, opening 54 may be defined by a cutout portion that extends to the bottom surface of body member 34. Opening 54 is aligned with the protuberance 46 so that the operator can visually verify that the attachment member is properly secured to the roller chain tabs. Opening 54 also provides access for a tool to aid in disengaging body member 34 from the roller chain tab.

Body member 34 may include longitudinally extending slits 48 defined therethrough to aid in sliding the body member onto the roller chain tab. These slits define a resilient tab 50. The protuberances 46 may be defined on this tab 50. Resilient tab 50 thus provides for a resilient type of "snap-fit" upon the attachment member being slid onto the roller chain tabs 28. Tab 50 may include an extreme bottom end 52 that is shorter than front wall 42, as is particularly seen in FIGS. 2 and 4. This type of configuration permits the attachment members to be more readily slid onto the roller chain tabs 28. It should, however, be appreciated that the longitudinal slits may not be necessary. The body member 34 may be formed of a material having sufficient inherent resiliency to allow the body member to be readily slid onto the roller chain tab without a slit or other "aid."

It should be appreciated by those skilled in the art that the present invention includes modifications and variations to the embodiments described herein. For example, the attachment members are not limited to the generally rectangular shape illustrated in the figures, or to any particularly type of material. The present invention includes the modifications and variations as come within the scope and spirit of the appended claims and their equivalents.

What is claimed is:

1. An attachment member for attaching in a snap-fit manner to a tab defined on a roller chain link plate, said attachment member comprising:

a body member having a configuration for carrying out a desired roller chain operation upon attachment of said body member to a roller chain, said body member including a bottom end;

a cavity defined in said bottom end of said body member, said cavity having dimensions so that said body member is slidable with a snug fit onto a tab on a roller chain link plate; and wherein said cavity is defined by a back wall, sides, and a front wall, and further comprising a protuberance extending from said back wall into said cavity towards said front wall, said protuberance having a length and disposed so as to be engageable into a hole defined in the tab on the roller chain link plate upon said body member being slid onto the tab to securely attach said body member thereto.

2. The attachment member as in claim 1, wherein said body member is formed of a plastic material.

3. The attachment member as in claim 1, wherein said back wall further comprises a resilient tab, said protuberance defined on said resilient tab.

4. The attachment member as in claim 3, wherein said back wall further comprises at least two longitudinal slits defined therein, said resilient tab defined between said longitudinal slits.

5. The attachment member as in claim 1, wherein said front wall further comprises an opening defined therethrough into said cavity, said opening disposed generally opposite said protuberance.

6. The attachment member as in claim 1, wherein said body member comprises a generally rectangular shape.

7. An attachment member for attaching in a snap-fit manner to a tab provided on a roller chain link plate, said attachment member comprising:
   a plastic body member having a configuration for carrying out a desired operation upon attachment of said body member to a roller chain, said body member including a bottom end;
   a cavity defined in said bottom end of said body member, said cavity having dimensions corresponding essentially to an extension tab provided on a roller chain link plate so that said body member is slidable with a snug fit onto the extension tab;
   said cavity defined by a back wall, sides, and a front wall, and further comprising a protuberance extending from said back wall into said cavity towards said front wall, said protuberance having a shape so as to fit into a hole defined in the extension tab upon said body member being slid onto the extension tab to securely attach said body member thereto;
   said back wall further comprising a resilient tab defined between two longitudinally extending slits defined through said back wall, said protuberance defined on said resilient tab so as to snap into the hole in the tab upon said body member being slid onto the extension tab; and
   said front wall comprising an opening defined therethrough into said cavity, said opening disposed generally opposite said protuberance.

8. A roller chain assembly, comprising:
   a roller chain having a plurality of interconnected and alternating roller links and pin links, each of said roller links and pin links comprising opposite link plates;
   a plurality of spaced extension tabs defined on certain said link plates, said tabs further comprising at least one hole defined therethrough;
   at least one attachment member attached to at least one of said extension tab, each said attachment member further comprising:
      a body member having a configuration for carrying out a desired roller chain operation upon attachment thereof to said roller chain, said body member including bottom end;
      a cavity defined in said bottom end of said body member, said cavity having dimensions corresponding essentially to said extension tab so that said body member is slidable with a snug fit onto said extension tab; and
      wherein said cavity is defined by a back wall, sides, and a front wall, and further comprising at least one protuberance extending from said back wall into said cavity towards said front wall, said protuberance having a shape so as to fit into said hole defined in said extension tab upon said body member being slid onto said extension tab to securely attach said body member thereto.

9. The assembly as in claim 8, wherein said body member is formed of a plastic material.

10. The assembly as in claim 8, wherein said back wall further comprises a resilient tab, said protuberance defined on said resilient tab so as to snap into said hole in said extension tab.

11. The assembly as in claim 10, wherein said back wall further comprises at least two longitudinal slits defined therein, said resilient tab defined between said longitudinal slits.

12. The assembly as in claim 8, wherein said front wall further comprises an opening defined therethrough into said cavity, said opening disposed generally opposite said protuberance.

13. The assembly as in claim 8, wherein said body member comprises a generally rectangular shape configured for conveying cartons on the roller chain.

14. The assembly as in claim 8, wherein said tabs extend generally transverse from said link plates, said body member comprising a bottom section having said cavity defined therein, and a top section angled away from said bottom section.

15. The assembly as in claim 8, wherein said tabs extend generally vertically from said link plates.

16. The assembly as in claim 8, wherein said tabs comprise at least two holes defined therethrough, said back wall including a corresponding number of said protuberances.

17. A roller chain assembly, comprising:
   a roller chain having a plurality of interconnected and alternating roller links and pin links, each of said roller links and pin links comprising opposite link plates;
   a plurality of spaced apart extension tabs defined on certain said link plates, said tabs further comprising at least on hole defined therethrough;
   at least one attachment member attached to at least one of said extension tab, each said attachment member further comprising:
      a plastic body member having a configuration for carrying out a desired operation upon attachment of said body member to a roller chain, said body member including bottom end;
      a cavity defined in said bottom end of said body member, said cavity having dimensions corresponding essentially to said tab carried by a roller chain link plate so that said body member is slidable with a snug fit onto said tab;
      said cavity defined by a back wall, sides, and a front wall, and further comprising a protuberance extending from said back wall into said cavity towards said front wall, said protuberance having a shape so as to fit into a hole defined in said tab upon said body member being slid onto said tab to securely attach said body member thereto;
      said back wall further comprising a resilient tab defined between two longitudinally extending slits defined through said back wall, said protuberance defined on said resilient tab so as to snap into the hole in the extension tab upon said body member being slid onto the extension tab; and
      said front wall comprising an opening defined therethrough into said cavity, said opening disposed generally opposite said protuberance.

* * * * *